United States Patent [19]
Beraud et al.

[11] Patent Number: 5,175,702
[45] Date of Patent: Dec. 29, 1992

[54] DIGITAL SIGNAL PROCESSOR ARCHITECTURE WITH PLURAL MULTIPLY/ACCUMULATE DEVICES

[75] Inventors: Jean-Paul Beraud, Nice; Claude Galand, Cagnes sur Mer, both of France

[73] Assignee: International Business Machines Corporation, Armonk, N.Y.

[21] Appl. No.: 643,254

[22] Filed: Jan. 22, 1991

[30] Foreign Application Priority Data

Jul. 18, 1990 [EP]  European Pat. Off. ........ 90480101.6

[51] Int. Cl.⁵ .............................................. G06F 7/38
[52] U.S. Cl. ................................ 364/736; 364/728.01
[58] Field of Search .............. 364/736, 724.01, 724.16, 364/728.01

[56] References Cited

U.S. PATENT DOCUMENTS

| | | | |
|---|---|---|---|
| 4,490,807 | 12/1984 | Chevillat et al. | 364/736 |
| 4,694,416 | 9/1987 | Wheeler et al. | 364/736 |
| 4,896,285 | 1/1990 | Ishikawa et al. | 364/724.01 |

FOREIGN PATENT DOCUMENTS 0320352  6/1989  European Pat. Off.

OTHER PUBLICATIONS

Patent Abstracts of Japan, vol. 12, No. 161 (p-702), May 17, 1988; & JP-A-62 274 426 (Daikin Ind. Ltd) Nov. 28, 1987.
1986 IEEE International Symposium on Circuits and Systems, San Jose, Calif., May 5-7, 1986, vol. 1, pp. 231-234, IEEE, New York; L. Schirm: "GOPS-A 45MHz Continuous Digital Signal Processor".

Primary Examiner—Tan V. Mai
Attorney, Agent, or Firm—Edward H. Duffield

[57]  ABSTRACT

An improved digital signal processor (DSP) architecture includes several multiply/accumulate devices (M-Unit 0-K) connected to the DSP bus through a delay line and elements for simultaneously operating the multiply/accumulate devices and a device for selectively storing accumulated values into a pre-assigned Dual-Port Randomly Accessible Memory area.

5 Claims, 10 Drawing Sheets

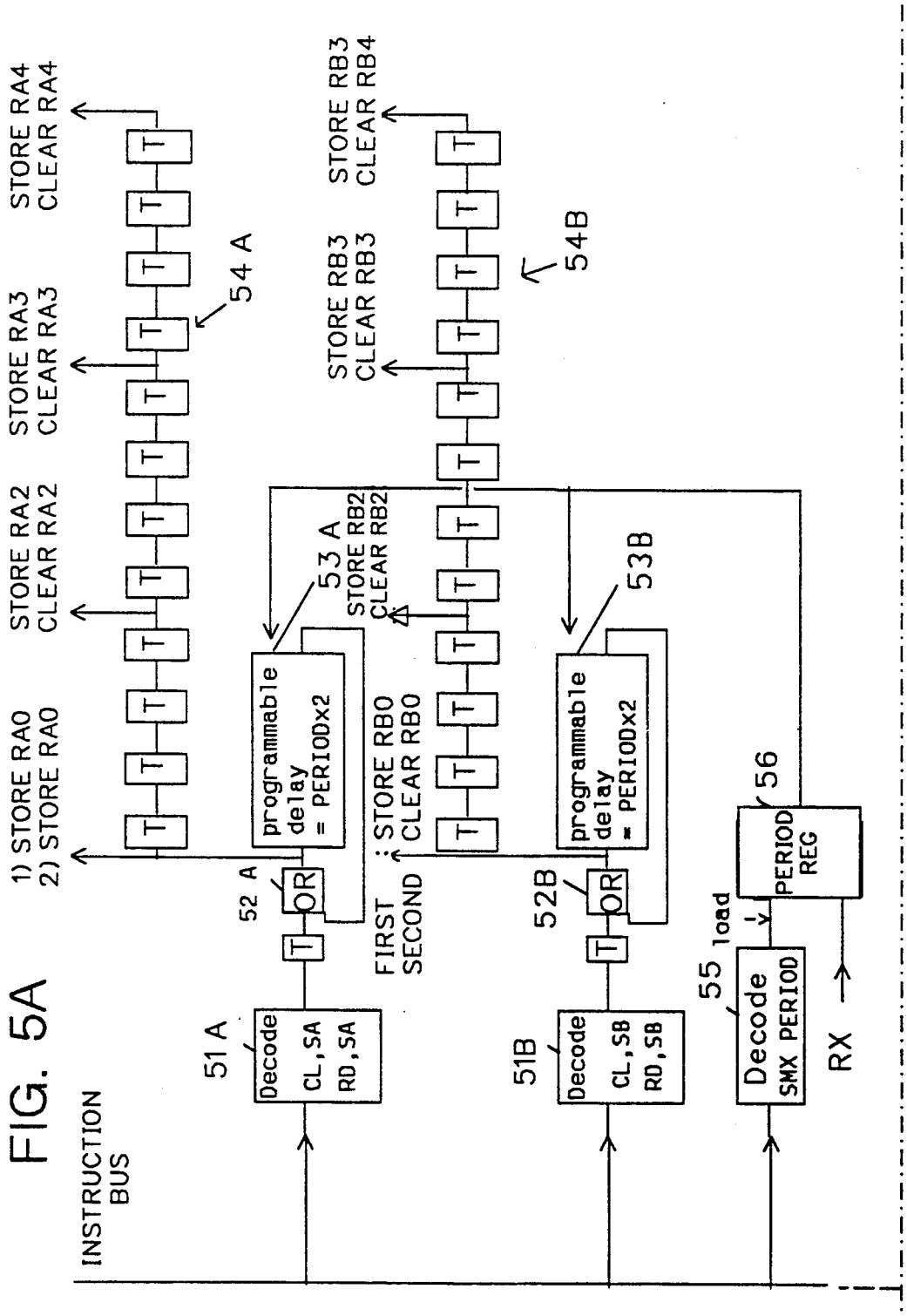

FIG. 7

| Instruction | | Status of registers | | Increment of accumulators | | Cycle |
|---|---|---|---|---|---|---|
| | | RX | RY | RA | RB | |
| LDX | X1 | X1 | | | | 1 |
| LDY | A1 | X1 | A1 | | | 2 |
| LDX X2 | CL, SA | X2 | A1 | 0 | | 3 |
| LDY A2 | CL, SB | X2 | A2 | | 0 | 4 |
| LDX X3 | M+A,SA | X3 | A2 | X1.A1 | | 5 |
| LDY A3 | M+B,SB | X3 | A3 | | X2.A1 | 6 |
| LDX X4 | M+A,SA | X4 | A3 | X2.A2 | | 7 |
| LDY A4 | M+B,SB | X4 | A4 | | X3.A2 | 8 |
| LDX X5 | M+A,SA | X5 | A4 | X3.A3 | | 9 |
| LDY A5 | M+B,SB | X5 | A5 | | X4.A3 | 10 |
| LDX X6 | M+A,SA | X6 | A5 | X4.A4 | | 11 |
| LDY A6 | M+B,SB | X6 | A6 | | X5.A4 | 12 |
| LDX X7 | M+A,SA | X7 | A6 | X5.A5 | | 13 |
| LDY A7 | M+B,SB | X7 | A7 | | X6.A5 | 14 |
| LDX X8 | M+A,SA | X8 | A7 | X6.A6 | | 15 |
| LDY A8 | M+B,SB | X8 | A8 | | X7.A6 | 16 |
| LDX X9 | M+A,SA | X9 | A8 | X7.A7 | | 17 |
| | M+B,SB | | | | X8.A7 | 18 |
| | M+A,SA | | | X8.A8 | | 19 |
| | M+B,SB | | | | X9.A8 | 20 |
| SJMAH | 0 | Store R(A) | | | | 21 |
| SJMBH | 1 | Store R(B) | | | | 22 |

FIG. 8A

| Cycle | Operation | | RX | RY | Y2 | Y3 | Y4 | RA0 | RB0 | RA2 | RB2 | RA3 | RB3 | RA4 | RB4 |
|---|---|---|---|---|---|---|---|---|---|---|---|---|---|---|---|
| | LDX | 8,CL,A | | | | | | | | | | | | | |
| | SMX | PERIOD | | | | | | | | | | | | | |
| 1 | SMAH | CLHA | | | 0 | 0 | 0 | | | | | | | | |
| 2 | LDX X1 | | X1 | | | | | | | | | | | | |
| 3 | LDY A1 | | X1 | A1 | | | | | | | | | | | |
| 4 | LDX X2 | CL,SA | X2 | A1 | | | | 0 | | | | | | | |
| 5 | LDY A2 | CL,SB | X2 | A2 | | | | | 0 | | | | | | |
| 6 | LDX X3 | M+A,SA | X3 | A2 | | | | X1.A1 | | | | | | | |
| 7 | LDY A3 | M+B,SB | X3 | A3 | A1 | | | | X2.A1 | | | | | | |
| 8 | LDX X4 | M+A,SA | X4 | A3 | A1 | | | X2.A2 | | 0 | | | | | |
| 9 | LDY A4 | M+B,SB | X4 | A4 | A2 | | | | X3.A2 | | 0 | | | | |
| 10 | LDX X5 | M+A,SA | X5 | A4 | A2 | | | X3.A3 | | X3.A1 | | | | | |
| 11 | LDY A5 | M+B,SB | X5 | A5 | A3 | A1 | | | X4.A3 | | X4.A1 | | | | |
| 12 | LDX X6 | M+A,SA | X6 | A5 | A3 | A1 | | X4.A4 | | X4.A2 | | 0 | | | |
| 13 | LDY A6 | M+B,SB | X6 | A6 | A4 | A2 | | | X5.A4 | | X5.A2 | | 0 | | |
| 14 | LDX X7 | M+A,SA | X7 | A6 | A4 | A2 | | X5.A5 | | X5.A3 | | X5.A1 | | | |
| 15 | LDY A7 | M+B,SB | X7 | A7 | A5 | A3 | A1 | | X6.A5 | | X6.A3 | | X6.A1 | | |
| 16 | LDX X8 | M+A,SA | X8 | A7 | A5 | A3 | A1 | X6.A6 | | X6.A4 | | X6.A2 | | 0 | |
| 17 | LDY A8 | M+B,SB | X8 | A8 | A6 | A4 | A2 | | X7.A6 | | X7.A4 | | X7.A2 | | 0 |
| 18 | LDX X9 | M+A,SA | X9 | A8 | A6 | A4 | A2 | X7.A7 | | X7.A5 | | X7.A3 | | X7.A1 | |
| 19 | LDY A1 | M+B,SB | X9 | A1 | A7 | A5 | A3 | | X8.A7 | | X8.A5 | | X8.A3 | | X8.A1 |
| 20 | LDX XA | M+A,SA | XA | A1 | A7 | A5 | A3 | X8.A8 | | X8.A6 | | X8.A4 | | X8.A2 | |
| 21 | LDY A2 | M+B,SB | XA | A2 | A8 | A6 | A4 | 0 | X9.A8 | | X9.A6 | | X9.A4 | | X9.A2 |
| 22 | LDX XB | M+A,SA | XB | A2 | A8 | A6 | A4 | X9.A1 | 0 | X9.A7 | | X9.A5 | | X9.A3 | |
| 23 | LEY A3 | M+B,SB | XB | A3 | A1 | A7 | A5 | | XA.A1 | | XA.A7 | | XA.A5 | | XA.A3 |
| 24 | LDX XC | M+A,SA | XC | A3 | A1 | A7 | A5 | XA.A2 | | XA.A8 | | XA.A6 | | X4.A4 | |
| 25 | LDY A4 | M+B,SB | XC | A4 | A2 | A8 | A6 | | XB.A2 | 0 | XB.A8 | | XB.A6 | | XB.A4 |
| 26 | LDX XD | M+A,SA | XD | A4 | A2 | A8 | A6 | XB.A3 | | XB.A1 | 0 | XB.A7 | | XB.A5 | |
| 27 | LDY A5 | M+B,SB | XD | A5 | A3 | A1 | A7 | | XC.A3 | | XC.A1 | | XC.A7 | | XC.A5 |
| 28 | LDX XE | M+A,SA | XE | A5 | A3 | A1 | A7 | XC.A4 | | XC.A2 | | XC.A8 | | XC.A6 | |
| 29 | LDY A6 | M+B,SB | XE | A6 | A4 | A2 | A8 | | XD.A4 | | XD.A2 | 0 | XD.A8 | | XD.A6 |
| 30 | LDX XF | M+A,SA | XF | A6 | A4 | A2 | A8 | XD.A5 | | XD.A3 | | XD.A1 | 0 | XD.A7 | |
| 31 | LDY A7 | M+B,SB | XF | A7 | A5 | A3 | A1 | | XE.A5 | | XE.A3 | | XE.A1 | | XE.A7 |
| 32 | LDX XG | M+A,SA | XG | A7 | A5 | A3 | A1 | XE.A6 | | XE.A4 | | XE.A2 | | XE.A8 | |
| 33 | LDY A8 | M+B,SB | XG | A8 | A6 | A4 | A2 | | XF.A6 | | XF.A4 | | XF.A2 | 0 | XF.A8 |
| 34 | LDX XH | M+A,SA | XH | A8 | A6 | A4 | A2 | XF.A7 | | XF.A5 | | XF.A3 | | XF.A1 | 0 |
| 35 | LDY A1 | M+B,SB | XH | A1 | A7 | A5 | A3 | | XG.A7 | | XG.A5 | | XG.A3 | | XG.A1 |
| 36 | LDX XI | M+A,SA | XI | A1 | A7 | A5 | A3 | XG.A8 | | XG.A6 | | XG.A4 | | XG.A2 | |

```
37  LDY A2 M+B,SB    XI A2 A8 A6 A4    0     XH.A8    XH.A6    XH.A4    XH.A2
38  LDX XJ M+A,SA    XJ A2 A8 A6 A4    X9.A1 0        XH.A7    XH.A5    XH.A3
39  LDY A4 M+B,SB    XJ A3 A1 A7 A5          XA.A1    XI.A7    XI.A5    XI.A3
40  LDX XK M+A,SA    XK A3 A1 A7 A5    XA.A2 XI.A8    XI.A6    XI.A4
41  LDY A5 M+B,SB    XK A4 A2 A8 A6          XB.A2    0        XJ.A8    XJ.A6    XJ.A4
42  LDX XL M+A,SA    XL A4 A2 A8 A6    XB.A3 XB.A1    0        XJ.A7    XJ.A5
43  LDY A6 M+B,SB    XL A5 A3 A1 A7          XC.A3    XC.A1    XK.A7    XK.A5
44  LDX XM M+A,SA    XM A5 A3 A1 A7    XC.A4 XC.A2    XK.A8    XK.A6
 .   .   .    .      XM A6 A4 A2 A8          XD.A4    XD.A2    0        XL.A8    XL.A6
```

Operation         Status of registers and increment of accumulators
                  RX RY Y2 Y3 Y4    RA0   RB0   RA2   RB2   RA3   RB3   RA4   RB4

DIGITAL SIGNAL PROCESSOR ARCHITECTURE WITH PLURAL MULTIPLY/ACCUMULATE DEVICES

FIELD OF INVENTION

This invention deals with digital signal processing and it addresses more particularly an improved digital signal processor architecture for performing specific signal processing operations.

BACKGROUND OF THE INVENTION

Is well known that applications requiring digital signal processing are expanding tremendously. For instance, applications requiring voice, or image signal processing for further transmission over digital networks or storage . . . , are obviously becoming commonly requested.

Most of these applications do require filtering (convolution) or correlation operations which are fairly high processor computing power consumers. Signal processor architectures have therefore been looked for, which would optimize available computing power versus processor size and power supply requirements.

For instance, taking into account the fact that the above mentioned convolution/correlation operations do involve repetitive digital multiplications, a processor architecture has been proposed wherein a multiplier is connected in parallel over the processor Arithmetic and Logic Unit (ALU) input and then feeds multiplication results back into ALU, to then store the result in either one of two accumulators connected to get the ALU output.

Alternatively switching ALU output from one accumulator to another, already improved the processor operating cycles.

For further details on both techniques, one may refer to G. Ungerboeck et al, "Architecture of a DSP" in IBM Journal of Research and Development, Vol. 29, N. 2, April 1985. Yet further improvements are still being looked for to keep proceeding toward signal processor optimization.

BRIEF SUMMARY OF THE INVENTION

This invention provides for an improvement in the speed of performance by providing both multi-multiplier implementation and judiciously designed hardware assisting devices provided with the processor control logic.

More particularly, the invention calls for an improved digital signal processor (DSP) architecture for computing values (R) by accumulating products of values from a first set of values (X) sequentially fed at a given rate, with values from a second set of P values (A); said improved DSP including: K Multiply-Add Units (M-UNIT)s, K being a submultiple of P; means for feeding each X value into the M-UNITs in parallel; means for feeding said A values into said M-UNITs through a first delay line at said given rate, whereby K values R are being computed by successive accumulations; and a program controlled logic means including second delay line means connected to said M-UNITs and controlling on-the-fly storage of computed R values into Random Access Storage means.

In summary, the invention provides a single chip solution for optimizing specialized digital signal processor devices (DSP) by providing an architecture based on a hardware assisting means plugged onto the DSP bus, without requiring specific redesign of the original DSP chip.

The foregoing and other objects features and advantages of the invention will be apparent from the following more particular description of the preferred embodiment of the invention, as illustrated in the accompanying drawings.

BRIEF DESCRIPTION OF THE DRAWINGS

FIGS. 5A-5B, and 6 are detailed implementations of circuits of FIG. 3.

FIG. 7 shows a table of timing operations in a specific example for operation of the preferred embodiment.

FIGS. 8A-8B, shows a Data Flow Table resulting from the example operations.

DESCRIPTION OF PREFERRED EMBODIMENT

Let's just first recall that FIR digital filtering involve performing the following operations:

$$y_{(n)} = \sum_{i=0}^{P-1} a(i) \cdot x_{(n-i)} \quad (1)$$

Wherein:
x(n) represents the nth input signal sample, said input signal being initially sampled at a rate f=1/T, wherein T is a predefined time period.
y(n) are output signal samples provided by the filter.
a(i) are the so called "coefficients" defining the filtering function to be achieved with a predefined filter of length P.

Equation (1) may also be considered as representing cross correlation operations between signals a(i) and x(-i), or between two sets of data.

As far as the present invention is concerned, both convolutions and correlations involve multiplication/accumulation operations to be computed repetitively and cyclically. As far as this invention is concerned, also, both these operations may be summarized into one equation (2):

$$R_{(j)} = \sum_{i=1}^{P} A(i) \cdot X_{(j+i)} \quad j = 0, N - 1 \quad (2)$$

which represents more particularly a correlation of order P over N points.

Current approaches for implementing the operations involved in equation (2) use Digital Signal Processors (DSPs), to enable flexibility with regard to variable N length as well as getting rid of synchronization requirement with respect to input samples (e.g. X) in view of improvements in integration technology providing high power DSPs.

Most currently available DSPs include memory means wherein both data and program (or micro-program) instructions may be stored, an Arithmetic and Logic Unit (ALU) for performing mathematical operations, input/output buffering means for storing processed (or to be processed) data therein, and bus means for interconnecting the above mentioned devices, using, in addition, clock means for synchronizing the overall operations.

Obviously such a device implementing above means could perform the computation of equation (2) through repetitive operations. However, these computations would interfere not only with any other DSP task, but also the DSP's operation would not be optimized.

As already mentioned, a first improvement was provided as disclosed in IBM Journal of Research and Development, Vol. 29, N. 2, March 1985, pp. 312-139, wherein a multiplier unit was added to the DSP and connected in parallel to the ALU. With this arrangement, the data fed into the ALU systematically multiplied with each other, and the result was collected only when requested by the DSP's stored program. Another improvement was provided by connecting two output buffers to the ALU and "zipping" alternatively those output buffers. Such a device has also been extensively described in U.S. Pat. No. 4,490,807 herein incorporated by reference.

A further improvement is now provided in the preferred embodiment through the use of multiple multipliers and special interconnection and control logic arrangements providing adequate and powerful hardware assistance.

Figure 1:
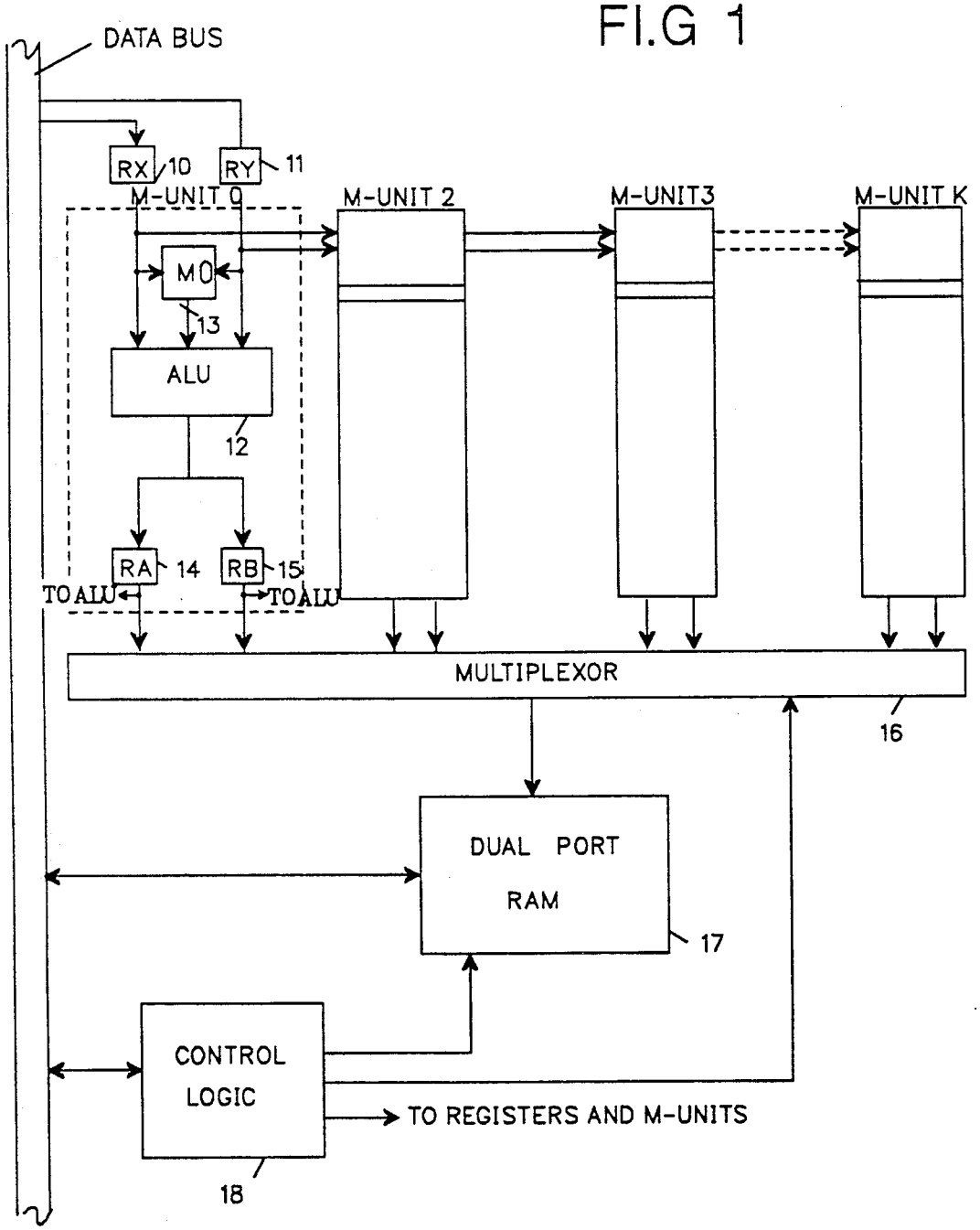
FIG. 1 is a block diagram of the digital signal processor.

Represented in FIG. 1 is a block diagram arrangement of a preferred embodiment of such an improved DSP. The device includes a conventional signal processor bus, herein designated DATA BUS through which both input and output data are transferred. Attached to said DATA BUS are the inputs of two registers RX (10) and RY (11) which are connected to an ALU (12) and to a multiplier M0 (13). The ALU is, in turn, connected to two output registers RA (14) and RB (15) the outputs of which are fed back into the ALU through a multiplexing device MPX0 (not shown). The device including the multiplexing device MPX0, the multiplier M0, the ALU and registers RA and RB is designated "M-UNIT 0". The outputs of M-UNIT 0 are connected to a multiplexor (16). Also connected to same multiplexor (16) are a predefined number (K-1) additional M-UNITS designated M-UNIT 2 through M-UNIT K. These M-UNITS are connected to the input registers RX and RY, i.e. cascaded in a manner that will be described further. The multiplexor (16) output is fed into a dual port random access memory (DUAL PORT RAM) (17), also connected to the DATA BUS. A CONTROL LOGIC (18) device connected to the DATA BUS is made to control the DUAL PORT RAM (17), the multiplexor (16), the registers and M-UNITS operations, either directly or through the DATA BUS.

Figure 2:
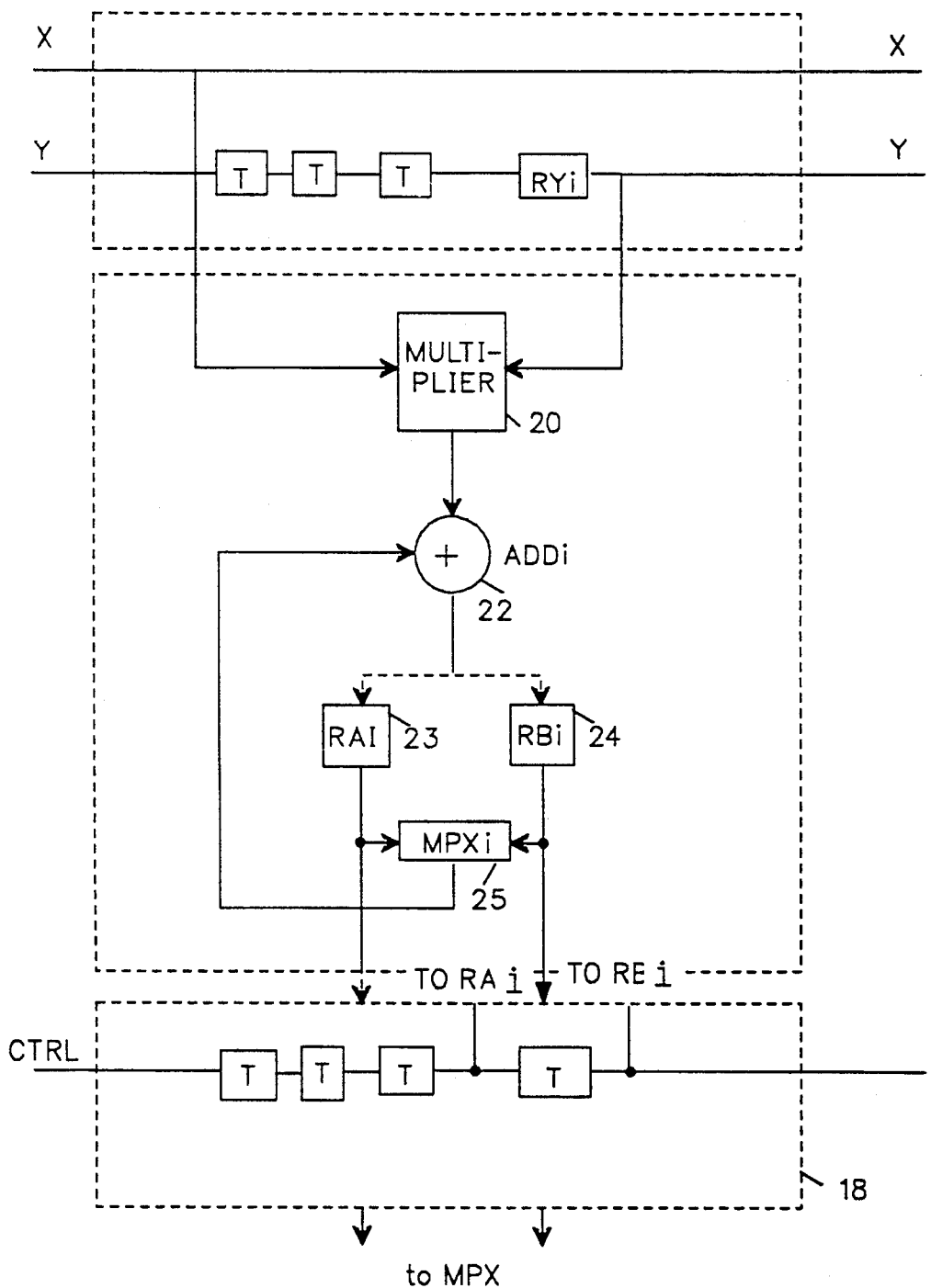
FIG. 2 is a detailed representation of devices of FIG. 1.

Represented in FIG. 2 is a block diagram for M-UNIT/i, with i=2, 3, ..., K, with associated control logic section (18) showing delays. The outputs of registers RX and RY have been designated X and Y, respectively, and are fed into X and Y lines. Line Y is connected to delay register elements (cells) designated T and RYi. Line X and delay register RYi are connected to a multiplier Mi (20), the output of which is fed into an adder ADDi (22). The adder (22) output is fed into output registers RAi (23) and RBi (24). The RAi and RBi outputs are fed back into adder (22) through a multiplexing device MPXi (25). A control signal CTRL provided by the CONTROL LOGIC block (18) is also provided for M-UNIT/i through a series of delay devices T to provide signals for controlling RAi and RBi operations, as shown further.

Since the improved signal processor operations to be considered are essentially oriented toward performing the operations of equations (1) or (2), then, the ALU (12) is essentially used as an adder. In other words, the M-UNITS are all performing similar multiply/add (accumulate) operations, and therefore K M-UNITS are provided overall, with the first one (M-UNIT 0) performing the ADD operations through the DSP ALU.

Figure 3:
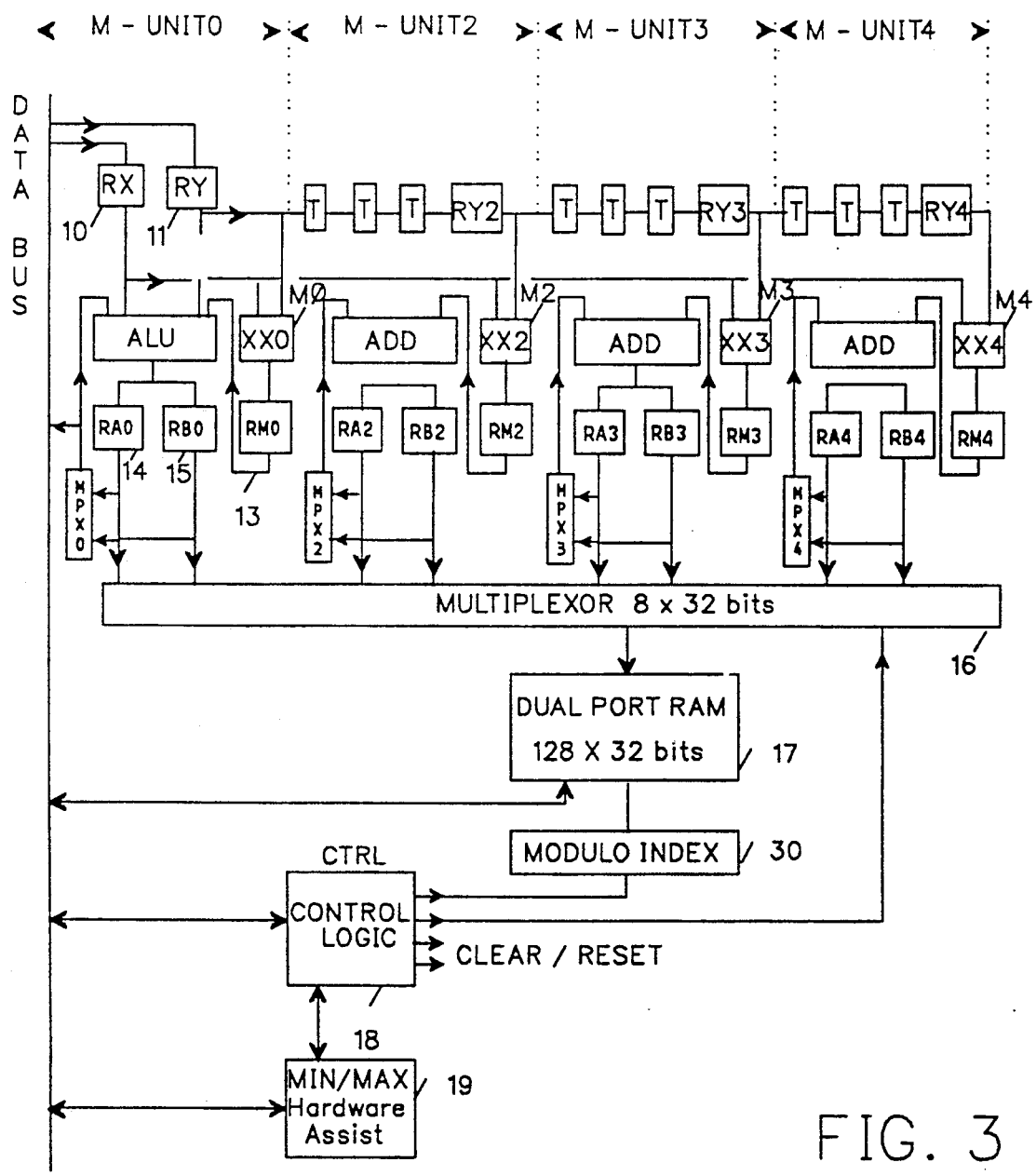
FIGS. 3 and 4 are more detailed representations of FIG. 1.

Represented in FIG. 3 is a K=4 M-UNITS block diagram. Assuming the system is made to process 16-bit words, then each M-UNITi for i=2, ..., K includes four 16-bit shift registers (T, T, T and RYi); two 32-bit accumulator-buffers (RAi, RBi), one 16×16 bits multiplier (Mi) including a multiplier device (XXi) feeding 32-bit results into a buffer register RMi and one 32+32 bits adder (ADD). The outputs of RAi and RBi are alternatively (selectively) fed back into corresponding adder (ADD) input, as well as multiplexed, when a sample value computation is completed, into the multiplexor (16) made to process 8×32 bits. The output of multiplexor (16) is fed into the 128×32 bits Dual Port RAM (17), also connected to the DATA BUS. Means for addressing the Dual Port RAM (17) are provided by control logic (18) through a modulo-index device (30). Modulo addressing enables cyclically scanning the RAM portion originally devoted for storing computed output samples.

The multiplexor operation is also controlled by said control logic device (18). Finally, the control logic (CTRL) (18) also provides sequential control signal as will be further detailed later.

To more fully understand the signal processor operation, let's assume the operations of equation (2) are to be performed using P=8 coefficients:

$$R_{(j)} = \sum_{i=1}^{8} A_{(i)} \cdot X_{(j-i)} \quad (3)$$

Let's apply this equation to a signal providing samples X1, X2, X3, X4, ... and storing those input samples in the RAM (17) through the data BUS.

In addition, to simplify in writing the equations, let's replace X10 by XA; X11 by XB; X12 by XC and so on. The output sample values to be computed would be:

$j = 0 \quad R0 = A1 \cdot X1 + A2 \cdot X2 + A3 \cdot X3 + A4 \cdot X4 +$ $\quad A5 \cdot X5 + A6 \cdot X6 + A7 \cdot X7 + A8 \cdot X8$ $j = 1 \quad R1 = A1 \cdot X2 + A2 \cdot X3 + A3 \cdot X4 + A4 \cdot X5 +$ $\quad A5 \cdot X6 + A6 \cdot X7 + A7 \cdot X8 + A8 \cdot X9$ $j = 2 \quad R2 = A1 \cdot X3 + A2 \cdot X4 + A3 \cdot X5 + A4 \cdot X6 +$ $\quad A5 \cdot X7 + A6 \cdot X8 + A7 \cdot X9 + A8 \cdot XA$ $j = 3 \quad R3 = A1 \cdot X4 + A2 \cdot X5 + A3 \cdot X6 + A4 \cdot X7 +$ $\quad A5 \cdot X8 + A6 \cdot X9 + A7 \cdot XA + A8 \cdot XB$ $j = 4 \quad R4 = A1 \cdot X5 + A2 \cdot X6 + A3 \cdot X7 + A4 \cdot X8 +$ $\quad A5 \cdot X9 + A6 \cdot XA + A7 \cdot XB + A8 \cdot XC$ $j = 5 \quad R5 = A1 \cdot X6 + A2 \cdot X7 + A3 \cdot X8 + A4 \cdot X9 +$ $\quad A5 \cdot XA + A7 \cdot XB + A7 \cdot XC + A9 \cdot XD$ -continued etc. . .

The system proceeds as long as input samples are available. The computed output samples are progressively computed through operations performed into registers RA0, RB0, RA2, RB2, RA3, RB3, RA4, RB4, the contents of which are orderly accumulated using the corresponding multiplexing devices (MPX) and adders (or ALU). Those computed output samples values are then transferred into the Dual Port RAM (17) prior to being outputted through the DATA BUS. Dual Port RAM (17) also stores input signal samples for buffering purposes.

Alternative switchings within a given M-UNIT between RA and RB registers, are performed using a so called "zip" technique which takes advantage of the M-UNIT architecture to optimize the throughput of the multiplier since it allows one multiply/accumulate operation (MAC) per cycle.

Let's assume, for instance, the evaluation is required of the operation of equation (3), for j=1, N. This which represents a correlation product of order 8 evaluated over N points. The zip technique is based on the concurrent computation of two consecutive results of these correlation products, e.g.:

$$R_{(j)} = \sum_{i=1}^{8} A_{(i)} \cdot X_{(j-i)}$$

$$R_{(j-1)} = \sum_{i=1}^{8} A_{(i)} \cdot X_{(j-i-1)}$$

The "A" accumulator is used to store the R(j) result while the "B" accumulator is used to store the R(j+1) result.

The table in FIG. 7 shows the timing (one line per cycle) of the operations. Note that j is assumed to be equal to 1 in the code sample corresponding to the evaluation of R(A) and R(B), whereby A and B are stored into register RA and RB, respectively.

The instructions in FIG. 7 bear the following meanings:

```
LDX X1 = Load RX with X1
LDY    = Load RY
CL. SA = Clear register A (RA)
Cl. SB = Clear register B
M + A, SA = Add multiplier contents with register A
            (RA)
            contents and store result into RA.
M + B, SB = Add multiplier contents with register RB
            contents and store result into RB.
```

With the device of FIG. 3, the architecture enables getting the value RX available to all M-UNITS, while properly adjusted coefficients are also made available for full parallel operation as will be made apparent from the DATA FLOW TABLE of FIG. 8.

The signal processor conventional ROM (not shown) is initially loaded with a microcode controlling the convolution/correlation (filter) operations.

Given the flow chart (or data-flow table of FIG. 8) of the operations to be performed, a man skilled in the art will have no difficulty in writing the microcode when given the following additional information:

| | |
|---|---|
| LDX 8, CL. A: | Load register RX with decimal number 8 (representing the filter length, i.e. the number of filter taps/coefficients), and clear register RA. |
| SMX PERIOD: | Load the filter period into a CONTROL LOGIC (18), through ALU device. |
| SMAH CLHA: | Load CONTROL LOGIC (18) with a synchro pulse value. Registers RY2, RY3, RY4, are all cleared. |
| LDX X1: | Load register RX with first signal sample X1. |
| LDY A1: | Load register RY with first coefficient A1. |
| LDX X2: | Load register RX with X2. |
| etc . . . | |

Due to the fact that the RX content is simultaneously made available to all multipliers XX0 through XX4, while coefficients will propagate through delay devices T and RYi, one may easily follow the flow chart. To be noticed is the fact that the contents of all registers RA and RB recirculate through ALU or ADD devices to perform accumulation operations.

In other words, the flow chart indication of X2.A2 into RA0 for instance, means X2.A2 added to previous RA0 content, i.e. X1.A1. Then, at the 20th cycle X8.A8 being the last value to be accumulated to get R0=A1.X1+A2.X2+A3.X3+. . . +A8.X8, the first output sample is now available and could be stored into the Dual Port RAM (17) through multiplexor (16) at an address provided by the modulo index register (30). This register acts as a sequentially and cyclically running counter made to generate addresses to store samples being constructed into a preassigned Dual Port RAM (17) area.

The data flow table shows also that using the zip technique, the next output sample, $$R1=A1.X2+A2.X3+...+A8.X9,$$

is being constructed to be available from RB0 one operating cycle after R0 is made available. Three cycles later RA2 provides:

$$R2=A1.X3+A2.X4+...+A8.XA$$

which is stored into the next RAM (17) address.
Then RB2 provides:

$$R3=A1.X4+A2.X5+...+A8.XB$$

and so on.

The RAM (17) does, therefore, act as a buffer to enable input sample rate and output sample construction and storage to be independent from each other and from the output rate to the DATA BUS. Therefore, it enables getting rid of synchro-problems, at least to some extent. Such an elastic buffering needs only proper adjustment of the RAM buffer size to the preassigned limits of input and output sample rates.

Figure 4:
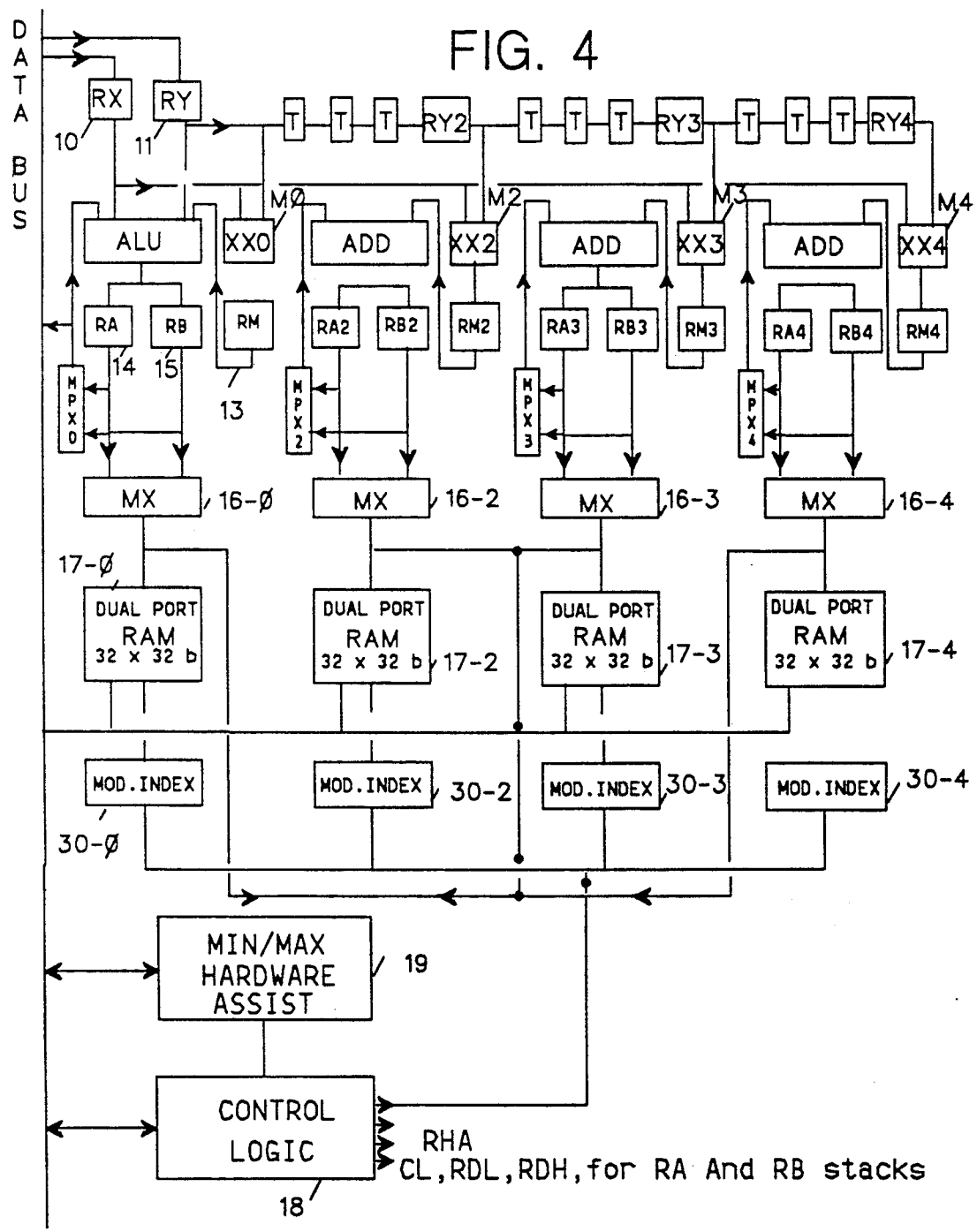

An important feature of the above described implementation of this invention lies in the fact that M-UNIT computed data are store "on-the-fly" into random access memory. Accordingly, the device of FIG. 3 is but one implementation. Another implementation is represented in FIG. 4 wherein the multiplexor (16), the dual-port RAM (17) and the Modulo Index device (30) have been split into pieces, each separately assigned to one M-UNIT.

An additional feature, i.e. Minimum/Maximum hardware assistance has been added to the device represented in FIG. 3, to enable on-the-fly peak tracking at no extra cost.

As will be apparent from the following description, the above mentioned hardware assistance applies to the device of FIG. 3, as well.

Figures 5, 5B:
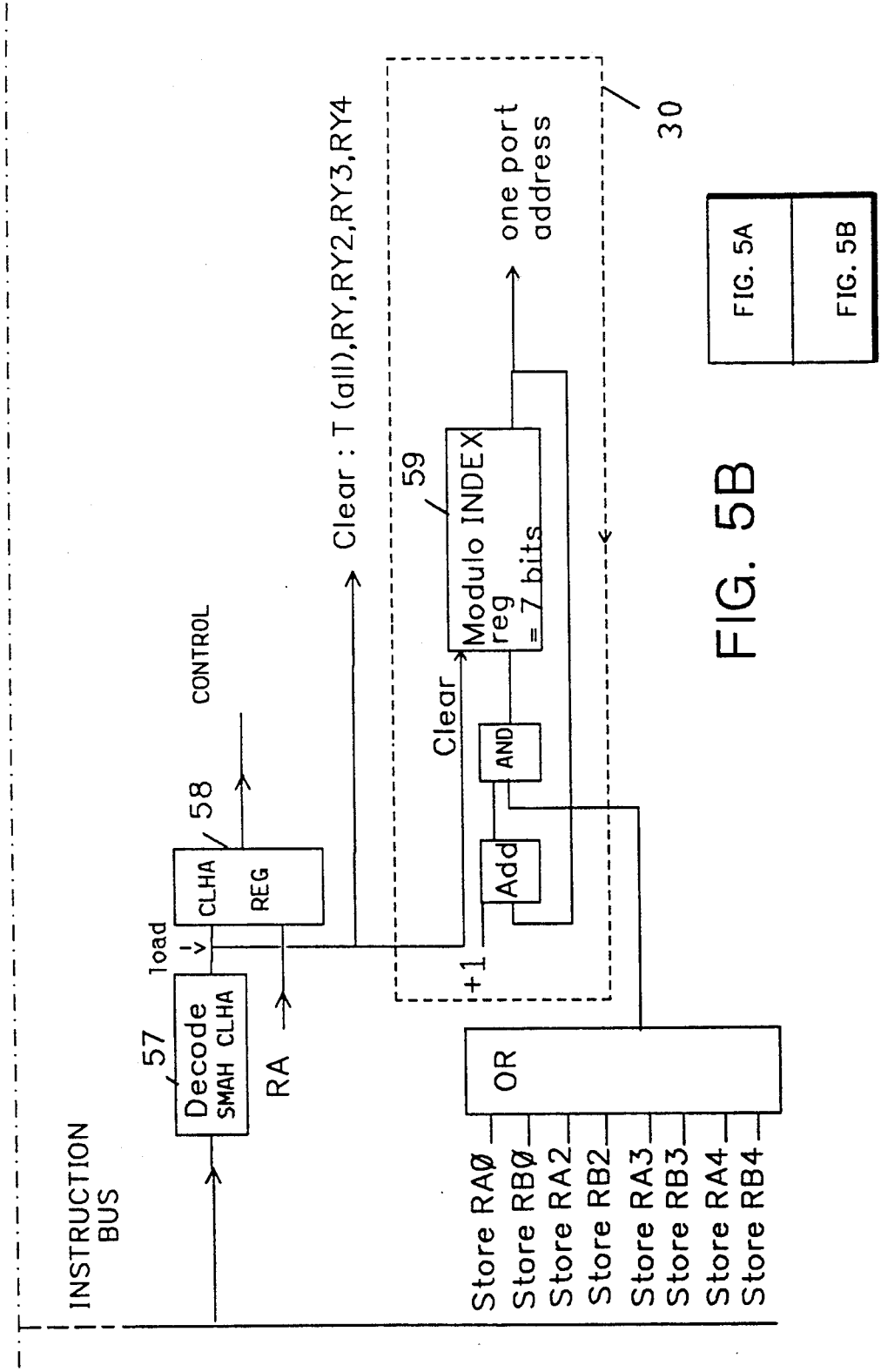

Represented in FIG. 5 is a circuit made to implement the so-called control logic block (18). The DATA BUS represented in FIG. 3 includes an instruction bus connected to a program memory (not shown) wherein the instructions used in the DATA FLOW TABLE have been stored. A decode CL,SA circuit (51A) is connected to decode the instruction CL,SA (clear SA) and provide a pulse signal. Said signal is first delayed one time period T and then fed into a circuit for generating the various RA reset pulses. To that end, the output of said T cell is fed into a recirculating circuit including an OR circuit (52A), a programmable delay circuit (53A) herein set to 2T, and a delay line (54A). The delay line provides regularly spaced pulses for controlling both the storage in registers RA0, RA2, RA3 and RA4 contents, into dual-port RAM (17) (or 17-0 through 17-4), and the clearance of said registers once their contents have been transferred. Hardware assisting circuit is thus provided which bears a structure somehow similar to the structure of the circuit connected to register RY (this explains the schematical representation in FIG. 2).

A similar circuit including decode (51B), delay cell T, OR circuit (52B), programmable delay (53B) and delay line (53), is also provided to generate store and clear pulses: store (RB0-RB4) and clear (RB0-RB4), for storing into designated registers or clearing said registers.

Figure 6:
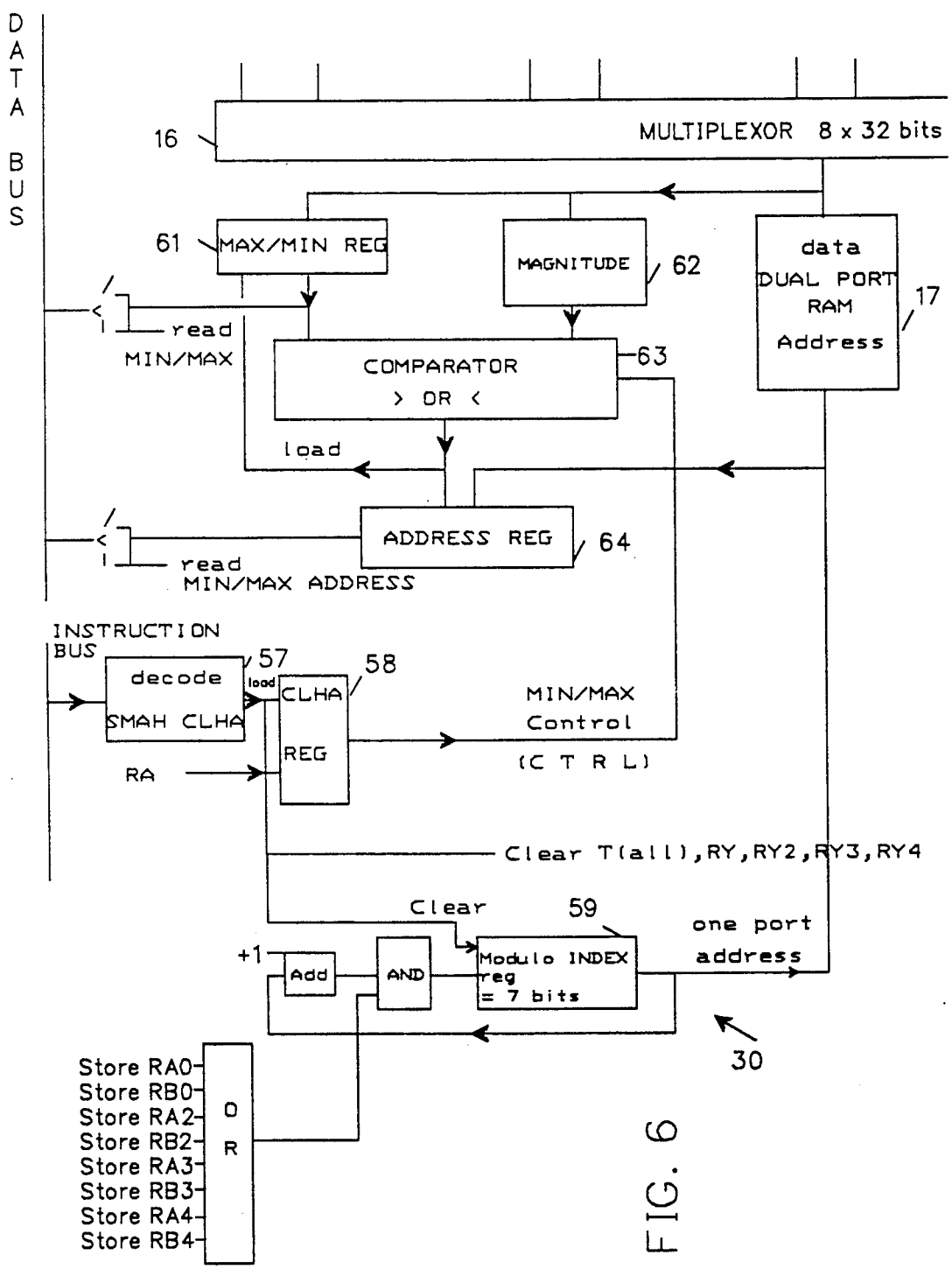

The filter period is settable and loadable into a PERIOD Register (56), through the signal processor ALU (not shown). To that end, a decode SMX PERIOD circuit (55) is provided, which, once loaded with the SMX PERIOD instruction (see DATA FLOW TABLE), decodes said instruction and generates a controlling pulse ("load"). The scalar value RX defining the filter length or number of coefficients (set to eight for the selected examples) is then loaded into PERIOD REG (56) and used to control the setting of programmable delays (53A) and (53B). The circuit is also provided with a decoder (57) for decoding the instruction SMAH CLHA into a pulse controlling the loading of a synchro pulse used to clear all delay cells T and registers RY, RY2, RY3, and RY4. Same control pulse ("load") provided by decoder (57) is also used to load a CLHA register (58) and provide control pulses as shown in FIG. 6. In addition, the load pulse provided by decoder (57) is used to clear the modulo index device (30). To that end, the modulo index device includes an increment by 1 (add) circuit connected to a logic AND circuit, which is in turn, connected to a 7-bit long register (59). The second input of the AND circuit is connected to an OR logic circuit fed with the RA0 through RB4 logic levels provided by devices (54A) and (54B). The output of modulo index register (59) is fed back to the second Add device input, this in turn, enabling sequential generation of DUAL PORT RAM (17) addresses for storage purposes as mentioned.

One may notice the apparent symmetry of the circuits of both delay lines, i.e. the one attached to register RY and the one (54) attached to the CONTROL LOGIC block, each M-UNIT being provided with a 4-T delay, as was schematically represented in FIG. 2.

Represented in FIG. 6 is a block diagram showing an implementation of the MIN/MAX Hardware Assistance device (19) of FIG. 3, meant to enable further optimizing typical vector quantizing applications. A similar arrangement also applies to the device of FIG. 4. Accordingly, each new 32-bit data to be inputted to the DUAL PORT RAM device, (17), is compared in magnitude to a value stored in a MIN/MAX Register. Should the currently considered magnitude be greater than MIN/MAX register contents, the register is updated with said current value and the modulo index is stored in an Address Register (64). The search for maximum or minimum magnitude sample on the DATA BUS can be selected by an additional bit in the CLHA register.

More particularly represented in FIG. 6 is an implementation of the MIN/MAX device (19) of FIG. 3. Two registers (61 and 62) are connected to the multiplexor (16). Register (61) stores both minimum and maximum sample magnitudes. Register (62) stores the current sample magnitude. Said registers (61) and (62) are connected to a comparator (63) comparing the current magnitude with stored MIN/MAX values to detect any sample greater than MAX or smaller than MIN. The output of said comparator triggers updating register (61) contents, as well as the storage of updating MIN/MAX address into an Address Register (64). The CLHA register (58) provides a MIN/MAX control bit to initiate the compare operation into device (63).

Figures 8, 8B:
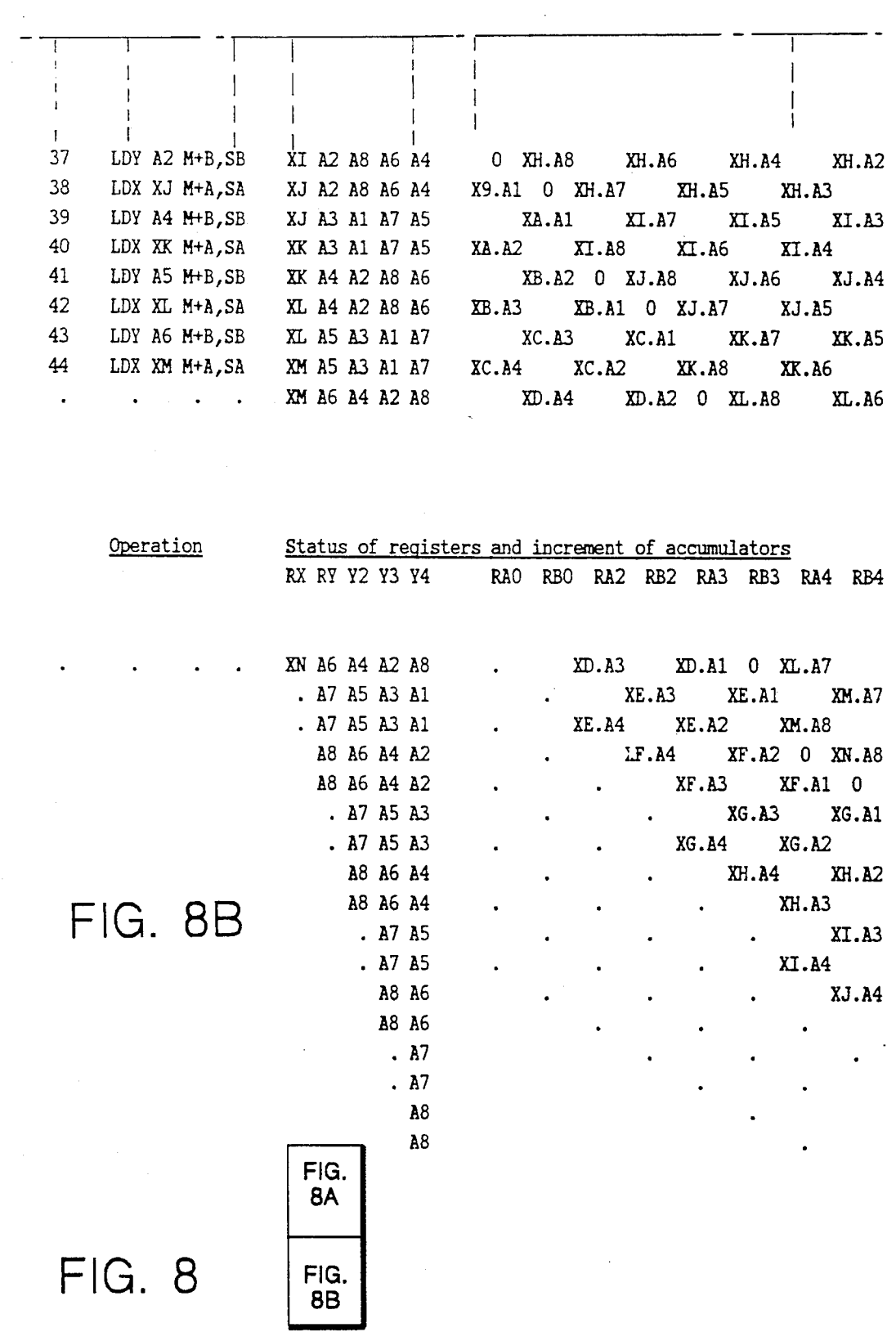

In summarizing the flow chart table in FIG. 8, one may see that the first two instructions initialize the period register with the scalar product order 8 defining the filter length.

The next instruction is used to initialize the hardware assisting devices.

The next 20 cycles are used to get the value of the first sample through successive RA0 accumulations. This value is stored in the dual port RAM at cycle 21 (since the CL, SA instruction is issued at cycle 4 and zip operations lead to alternatively providing RA and RB and therefore $2 \times 8 + 4 = 20$ cycles). The modulo index is post-incremented accordingly.

At time 21, the second output sample is available in register RB and is stored in the dual port RAM, since the CL, SB instruction is issued at cycle 5.

At time 24 (that is 3 cycles later), the third output sample is available in register RA2, and is stored into dual port RAM, and so on.

The same pulses provided by the circuit of FIG. 5 for resetting the RA's and RB's registers, are also used to control the storage of the those computed samples (values) into the Dual Port RAM.

In conclusion, a multiple-multiplier arrangement to a digital signal processor, combined with hardware assisting elements and properly adjusted software (microcode) controlling input/output operations, improves a digital signal processor architecture for optimizing computation of particularly useful, computing power-consuming, signal processing operations.

We claim:

1. An improved digital signal processor (DSP) architecture for computing values (R) by accumulating products of values from a first set of values (X) sequentially fed at a given rate, with values from a second set of P values (A), said improved DSP including:

K Multiply-Add Units (M-UNIT)s, K being a submultiple of P;

means for feeding each X value into all M-UNITs in parallel;

means for feeding said A values into said M-UNITs through a first delay line at said given rate, whereby K values R are being computed by successive accumulations; and, a program controlled logic means including second delay line means connected to said M-UNITs and controlling on-the-fly storage of computed R values into Random Access Storage means.

2. An improved digital signal processor according to claim 1 and wherein each M-UNIT includes:

a multiplier having a first input connected to said first registers (RX) and a second input connected to said first delay line;

a two input adder device;

means for connecting one adder input to said multiplier;

two accumulator/buffers;

means for alternatively connecting said accumulator/buffers to said adder device; and, means for selectively feeding back an accumulator/buffer contents into said adder device.

3. An improved digital signal processor according to claim 2 wherein said first M-UNIT (M-UNIT 0) adder function is performed by the processor ALU.

4. An improved digital signal processor as claimed in claim 1, 2 or 3, wherein said program controlled logic means includes:

a decoding device;

microcode means for providing said decoding device with a synchro pulse;

second delay line means connected to said decoding device and provided with taps; and, means for connecting said taps to control Dual Port RAM operations.

5. An improved digital signal processor as claimed in claim 4 and further, including a modulo index register connected to said control logic device and providing Dual Port RAM addresses for storing selected M-UNITs outputs into said RAM.

* * * * *